United States Patent
Beckett, II et al.

(10) Patent No.: US 11,663,103 B2
(45) Date of Patent: May 30, 2023

(54) AUTOMATIC CONTROL IDENTIFICATION

(71) Applicant: Pegasystems Inc., Cambridge, MA (US)

(72) Inventors: Stephen Marshall Beckett, II, Canton, GA (US); Christopher Arthur Clarke, Suwanee, GA (US); Zachary Earl Dillard, Alpharetta, GA (US)

(73) Assignee: Pegasystems, Inc., Cambridge, MA (US)

( * ) Notice: Subject to any disclaimer, the term of this patent is extended or adjusted under 35 U.S.C. 154(b) by 0 days.

(21) Appl. No.: 17/013,557

(22) Filed: Sep. 5, 2020

(65) Prior Publication Data
US 2021/0073095 A1 Mar. 11, 2021

Related U.S. Application Data

(60) Provisional application No. 62/897,134, filed on Sep. 6, 2019.

(51) Int. Cl.
| | | |
|---|---|---|
| *G06F 11/30* | (2006.01) | |
| *G06F 11/32* | (2006.01) | |
| *G06F 9/451* | (2018.01) | |
| *G06F 11/36* | (2006.01) | |

(52) U.S. Cl.
CPC .......... *G06F 11/302* (2013.01); *G06F 9/451* (2018.02); *G06F 11/323* (2013.01); *G06F 11/324* (2013.01); *G06F 11/3612* (2013.01)

(58) Field of Classification Search
CPC .... G06F 11/302; G06F 11/323; G06F 11/324; G06F 11/3612; G06F 9/451

USPC .......................................................... 717/127
See application file for complete search history.

(56) References Cited

U.S. PATENT DOCUMENTS

| | | | |
|---|---|---|---|
| 6,289,336 B1 * | 9/2001 | Melton | G06Q 30/0201 707/765 |
| 9,766,953 B2 | 9/2017 | Beckett et al. | |
| 10,268,535 B2 | 4/2019 | Hoshina | |
| 2007/0038322 A1 * | 2/2007 | Iizuka | G06F 30/00 700/97 |
| 2008/0127103 A1 * | 5/2008 | Bak | G06F 9/451 717/126 |
| 2014/0229846 A1 * | 8/2014 | Abaya | G06F 3/04847 715/744 |
| 2018/0109435 A1 * | 4/2018 | Li | H04L 45/02 |
| 2019/0065220 A1 * | 2/2019 | Chen | G06F 40/221 |
| 2019/0101882 A1 * | 4/2019 | Strinden | G05B 19/0426 |
| 2019/0130094 A1 * | 5/2019 | Votaw | G06F 21/44 |
| 2019/0205773 A1 * | 7/2019 | Ackerman | G06N 5/022 |
| 2020/0278993 A1 * | 9/2020 | Marino | G06K 7/1417 |

* cited by examiner

*Primary Examiner* — Chat C Do
*Assistant Examiner* — Bradford F Wheaton
(74) *Attorney, Agent, or Firm* — Patent Law Works LLP

(57) ABSTRACT

A technique to automatically identify controls of a software application is disclosed. Attributes of a software application are monitored. The attributes may include control type attributes. The controls are identified by determining a hierarchy of parent controls and children controls. A directed graph may be generated, based on the monitored control attributes, and used to identify the controls. The identified controls may be used for robotic process automation of the software application.

8 Claims, 15 Drawing Sheets

AUTOMATIC CONTROL IDENTIFICATION

CROSS-REFERENCE TO RELATED APPLICATIONS

The present disclosure claims the benefit of and priority to U.S. Provisional Application No. 62/897,134, filed Sep. 6, 2019, which is hereby incorporated herein in its entirety by this reference.

TECHNICAL FIELD

The present disclosure is related to automatic identification of controls in a software application. In some implementation, the identification of controls is performed to identify controls for a robotic process automation of one or more software applications.

BACKGROUND

A variety of business processes can be automated using robotic process automation. Robotic process automation is the act of automating the interaction of software application controls. This may be in the context of automating the interaction of software application controls in a single software application or in two or more different software applications.

Robotics process automation is generally understood to include executing operations against a user interface instead of entering commands against an API, which is typical for a service or server. Robotic process automation may, for example, include automating user interactions to log-in to one or more applications using a user interface, enter commands or inputs in one or more user interfaces, reading information, and using the read information in the same or in a different software application.

One problem with robotic process automation is the difficulty in identifying controls in a software application having a large collection of controls. There are tools to explore extremely simple static hierarchies of controls. One example is tools to display the control hierarchy of the windows of a Windows® Application. However, this is for the simple case that every control has its own separate window. However, this is not a realistic real-world example. In the real-world, a hierarchy of windows is insufficient to identify controls. As a trivial example, a single window may host multiple controls.

Additionally, some software applications periodically change. For example, some web applications have changing layouts that include attribute nodes with volatile values. Updates can occur frequently. The internal and external structure of pages can change with each update. Attributes on nodes can have generated values that vary from navigation to navigation. These aspects of software application that periodically change pose complications for identifying controls for robotic process automation.

Other approaches to identify controls don't provide information that's useful for robotic process automation. For example, identifying a current memory address of controls is insufficient, because memory addresses are transient and change from run-to-run.

A further issue is that many software applications have complex relationships between controls. For example, a software application may have many objects that are peers that are children of a common parent. When considering a collection of controls under a parent, there may be many objects each with hundreds of attributes. This problem is further exacerbated for dynamic interfaces that have controls that, for the same parent, can be moved, appear, hide, be created, or be destroyed.

Some approaches require a user to identify controls using a collection of match rules. For example, U.S. Pat. No. 10,268,535, the contents of which is hereby incorporated by reference, describes how an individual control is matched by solving a set of match rules. The match rules are typically manually selected by a user to select rules until all the controls match. However, there is a huge burden on users in terms of the training, skill, and time to manually solve match rules when there is a large collection of controls and attributes. Additionally, the use of match rules can be impractical in regards to the burden on users to match combinations of data from hundreds of attributes across many controls. As an example of some of the problems for user, one approach is to provide a default set of rule(s) for given technology/control type. However, if these default rules don't work, manual intervention is required on the part of the user, placing a large burden on the user to make the manual intervention. While there are some default match rule techniques that are sometimes successful in identifying controls without user intervention, they still have instances in which they fail to differentiate controls. In default cases, when the match rule technique fails, the user has to manually edit the resulting defaults.

SUMMARY

Techniques to identify controls of a software application are disclosed. An exemplary application is to identify controls of a software application for robotics process automation.

In one implementation, control attributes of a software application are monitored and controls of the software application are automatically identified. The monitoring may include monitoring attribute changes associated with interactions with a user interface.

In some implementations, a representation of parent controls and children controls is generated based on the monitored control attributes. Controls of the software application are automatically identified from the representation. In one implementation, the representation comprises a directed graph of parent controls and children controls. In one implementation, attribute path reduction is performed to generate the directed graph. In one implementation, monitoring control attributes of the software application comprises interrogating the software application as a user interacts with a user interface of the software application. In one implementation, the identified controls are used for robotic process automation of the software application. In one implementation, added controls and deleted controls are automatically identified.

DETAILED DESCRIPTION

Figure 1:
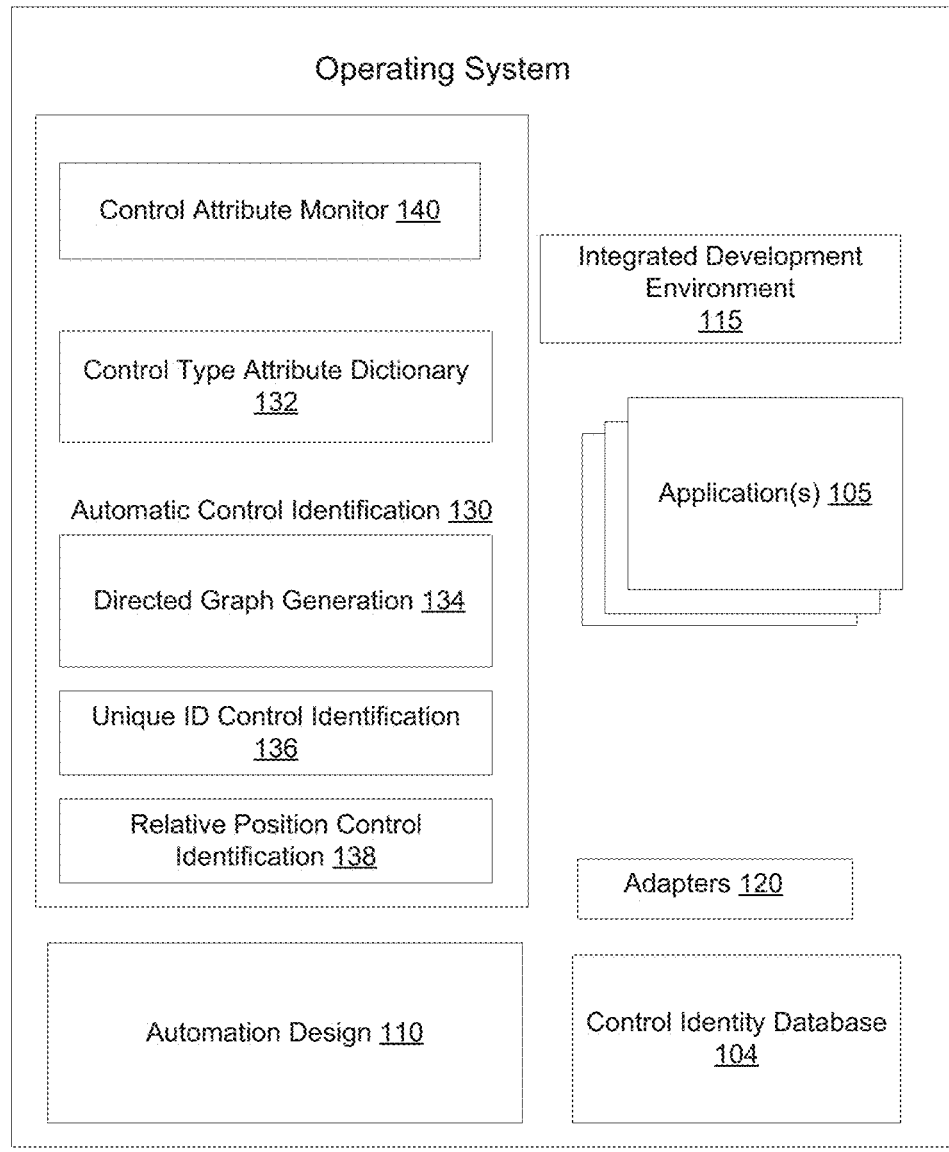
FIG. 1 is a block diagram of a real time control identification system in accordance with an implementation.

FIG. 1 illustrates an example of a system environment 100 for robotic process automation of software applications 105 using an automation design studio 110 and integrated development environment 115. The automation design studio 110 may, for example, automate a sequence of user interface screen interactions of one or more applications 105 by capturing user interface interactions, such as keyboard and mouse interactions. For example, as a user works through a business process, the steps taken by the user may be captured. For example, monitoring may be performed of detected events and detected control attributes. Recording logic may detect when steps are created in a recording used to generate an automation. However, more generally, automations may be created in other ways, including visual modeling or manually via scripting.

Adapters 120 may be provided to interact with the standard user interfaces of different software applications 105. The adapters 120 may, in some implementations, have corresponding adapter drivers to support automation. For example, an automation driver may create descriptions of controls to aid in automation against the controls.

The software applications 105 may include a variety of different types of software applications. The software applications 105 may, for example, be desktop applications having a user interface that includes, for example, labels, input text fields, buttons, or other user interface features for a user to interact with an application. Some examples include web-based software applications, word processing applications, spreadsheet applications, etc.

An individual software application 105 has a set of controls with associated attributes. As a non-limiting example, an individual application may have a variety of user interface control types, such as buttons, check boxes, combo boxes, labels, list boxes, list views, radio buttons, text boxes, tool boxes, and Windows® forms. During an automation design process, an interrogation process may be used to interrogate elements of a user interface a user interacts with. Some examples for a login process include interrogating a user name text box, a password text box, a login button, and an information label in a sign-in page.

An automatic control identification engine 130 automatically identifies controls of a software application. In principal, this may be the identification of at least one control. However, more typically, a robotic process automation requires a set of relevant controls to be identified for the automation. This may not necessarily require identifying each and every possible control of a software application.

This process used by the automatic control identification engine 130 may include discovering and uniquely identifying objects of a software application. Some aspects of automatic control identification may be framework specific depending on specific challenges associated with a given framework. In particular, the monitoring of control attributes by control attribute monitor 140 is typically framework specific. The identification of controls may include, for example, identifying a control type and may also include identifying contextual information related to the software application implementation, such as the software platform and software framework. A software stack may, for example, have a driver that talks to hardware with the driver being specific to the hardware. The software stack may include a graphics engine on top of the driver. The platform is the underlying software environment wherein an application is executed. Some examples of platforms include: Native Windows, .Net, JavaScript, and Java. Within a given platform, applications are constructed utilizing a set of tools and libraries that define a framework. Generally speaking, a supporting platform typically requires a unique implementation of the control identification technique due to differences in control types and control attributes.

A process of identifying controls may be based on building up a history of identifying controls. For example, the first time a control is encountered, it has not been previously identified and may enter an "unidentified" path that triggers the generation of a record for the control. In a subsequent encounter of the same control, the control identification engine can use the accumulated data to help identify the control. In some implementations, a control identity database 104 for the application is persisted that describes the application in terms of the hierarchy of the identified controls. In some implementations, the controls of the database are arranged in a hierarchy of containers.

For static controls, the position of an unidentified control can in some cases be identified if the application is static. In some cases, the position of an unidentified control relative to an identified control can be used to determine an identity of an unidentified control. In some cases, control identification can be based on a unique ID (for control purposes), if the framework supports it. However, for a dynamic application, attribute path reduction may be used to identify a control hierarchy and uniquely identify controls. In one embodiment, an "attribute path" is defined to be a path of greatest uniqueness, corresponding to the shortest path to uniqueness, through a population of sibling controls. The process of determining a minimal path to uniqueness can be described as "attribute path reduction."

A framework may have within it some unique attribute that can serve as a unique ID for control. For example, .NET WinForms®, uses "Name" which can be used as a unique ID for control purposes. But a unique control ID can be assigned to a discovered control instance based on an identification signature or identification metric (e.g., such as attribute path, relative position, or neighbors).

An individual user interface screen may have a variety of control types. For example, a screen may include text boxes for credentials and a button to press when credentials are entered. Each control has different attributes that are monitored and analyzed to determine a control identity. In some implementations, attribute path reduction is performed by the automatic control identification engine 130 based on control attributes monitored by control attribute monitor 140. As a non-limiting example, as an individual user interface screen many include a variety of attribute types that are encountered when a user navigates through text boxes and buttons. For example, consider a simple example of navigating a login screen. In this example, a user may enter text in specific boxes and select a login button. There are thus control type attribute paths that correspond to a control hierarchy with parent-child and peer relationships.

In some implementations, the automatic control identification engine 130 creates unique IDs of controls from a directed graph 134 generated from the monitored control attributes. The control hierarchy representation may, for example, be implemented as a graphical representation (or its software equivalent), such as a directed graph representation, although other equivalent representations may also be used.

In some implementations, a minimal attribute path technique is used to identify parent controls and children controls from the monitored attributes, with an exemplary graph structure being a directed graph. The minimal path technique may be described in different ways, but be described as attribute path reduction of pathways between parent controls and children controls. The automatic control identification engine 130 monitors attributes of controls, and determines the shortest attribute path (e.g., the ID).

The automatic control identification engine 130 may also eliminate attributes and resolve when attributes are found to be dynamic. In some implementations, the automatic control identification engine 130 interacts with a driver to monitor attributes of controls. In some implementations, control attributes that are consistent during application execution are identified as being suitable for identification of controls. For example, to minimize the requirement to resolve, the consistency of an ID is preferably strong enough to identify a control across numerous application instances. For example, if a framework supports a unique control ID that is immutable, this unique control ID associated with the framework can be selected to be the preferred choice over other possible unique control IDs based on control identification signatures or control identification metrics (e.g., relative position, neighbors, or attribute path). In some implementations, a composite unique ID is created that encompassed the possible ways a control can be identified uniquely through features of the framework and control identification signatures and identification metrics (e.g., by a unique control ID, relative position, attribute path, and neighbors). For example, In FIG. 12D, a "PegaID" may encompass the different techniques through which a control may be identified.

In one implementation, organic attributes are object data provided by the platform whereas custom attributes are data attributes generated by the driver (e.g., attributes not available from existing APIs). Some examples of custom attributes include neighbors and relative position.

In a directed graph implementation, the vertices of the directed graph represent either an attribute, or an object. Attributes are data of an object. The word "attribute" is used to be more generic and differentiate from "property." An object's property is an attribute, but so is an event handler, or custom data created by a custom algorithm to calculate. An object is an instance of a type. An object may be a visual object of a user interface but more generally may include nonvisual objects. For example, an object may include nonvisual objects for automation, such as database, networking, or authentication objects. The edges of the directed graph are directed from a vertex represent values of the source vertex attribute. Vertices that identify objects do not have out edges but the identified control may contain child controls in a container. An object that has child controls will have a dedicated graph for identifying the child objects.

In some implementations, the root of the directed graph represents a parent control of which all controls are children. The relationship of the controls to each other is described as sharing an equality of a given attribute.

In some implementations, the generation of the direct graph model starts with the type of control as the first attribute. This creates buckets of controls each of a particular control type, which assures future edges draw from a common set of attributes. A determination is then made of attributes with the most unique (different) values. This creates further buckets, and the edge can be thought of having an identity of "Attribute:Value". Once a vertex has just one control, there is no need to continue to look for unique values. It becomes a "sink" or "leaf"—has an out-degree of 0. Once the model is complete, all leaves are controls, and the traversal from the root to the vertex and accumulating edge values produces a unique ID.

In some implementations, a rule that is applied is that for a given collection of objects of the same type, the attribute with the greatest number of unique values is found. This attribute is assigned to a vertex. Each edge directed from this vertex is assigned one of the unique values. The objects that share this unique value represent a new list of objects of the same type. If there is more than one object, the process is repeated by finding an attribute with the greatest number of unique values, with each value getting an edge. If there is just one object, it is assigned to the vertex which terminates the branch. The path from the root, consisting of a set of attributes-value pairs, is the ID of the object. A requirement is that objects do not change types.

Controls may be automatically identified in real time. In some implementations, a mode of operation is supported in which the automatic control identification engine 130 adapts when controls are added or deleted. In this mode of operation, when attributes change, even if unexpected, the automatic control identification engine 130 re-solves. In some implementations, the identification of controls can be automatically generated when a user operates a software application 105 and navigates through the screens of a software application that they want to automate. However, more generally the identification of controls may be performed at other times to adapt to changes in controls, such as when controls are added or deleted in a software application. Thus, the automatic control identification can be performed during robotic process automation but may further be optionally continued thereafter on an intermittent, periodic, or continual basis.

In some implementations, a control type attribute dictionary 132 is created for a supported software platform to aid the automatic control identification engine 130 to determine what attributes to utilize. In some implementations, the control type attribute dictionary defines attributes, attribute types, and attribute weights. As an example, the control type attribute dictionary 132, for a given platform, may include a listing of supported control types, and a list of supported attributes or each control type. Each attribute may further have a list of optional parameters.

The control type attribute dictionary 132 may include a weighting scheme to optimize performance when there are a large number of attributes or dynamic interface attributes. In some use scenarios, the control type attribute dictionary 132 defines a large number of attributes for a large number of control types. For example, the control type attribute dictionary 132 may potentially define hundreds of attributes for hundreds of control types. In some use scenarios, weighting all attributes as equals would hurt performance. Consequently, in some implementations, each attribute is assigned a weight. A weight of zero indicates the attribute is to be ignored. A higher weight attribute would be favored over a lower weight when two attributes produce the same count of unique objects that have that value of the attribute. For example, attributes that are known to be dynamic may be eliminated by assigning a low weight, e.g., a zero weight. Attributes that are known to be consistently static may be given higher weights, e.g., 1. In this weighting scheme, the automatic control identification engine 130 is aided to quickly find a solution, and as the application executes, there is minimal re-solving.

In some implementations, a platform driver produces a base control type attribute dictionary 132 that contains a list of every type the driver supports, with each type defining attributes the driver supports. For example, for .Net WinForms®, the "Text" property may be highly weighted for Labels but disabled for TextBoxes.

In some implementations, the automatic control identification engine 130 identifies a directed graph of control types. A directed graph model, or similar data structure, is generated based on the monitored control attributes. A directed graph is a convenient data structure for reducing a population of choices into a solution. The directed graph may, for example, represent parent control types and children. In a directed graph implementation, the edge relationships in the graph are based on the monitored attributes. The edge relationships in the graph may be used for object identification (e.g., of visual user interface (UI) controls or other controls). While the attributes in the graph may correspond to UI properties, more generally the attributes are not limited to only UI properties.

In some implementations, the identification of a control may be based on a variety of techniques. This may include identifying a control using a unique ID 136 of a control based on a specific attribute. Another technique uses a relative position 138 for a static presentation. A relative position technique may be used to identify a control based on its position relative to other controls. Relative position is useful when, for example, the relative positioning of controls within an application does not change. Still another technique for the identification of the control may be based on attribute path reduction to generate a directed graph 134 for a dynamic application. In some implementations, a database of controls for a software application is persisted that describes the hierarchy of controls. Attribute path reduction identifies controls based on the shortest path set of attributes that is automatically calculated. Lookup tables or other data structure may be used to persistently store a current attribute graph, solution graph, and other information to use the directed graph data to identify controls. Still yet another technique is to identify a control based on its neighbors.

Figure 2:
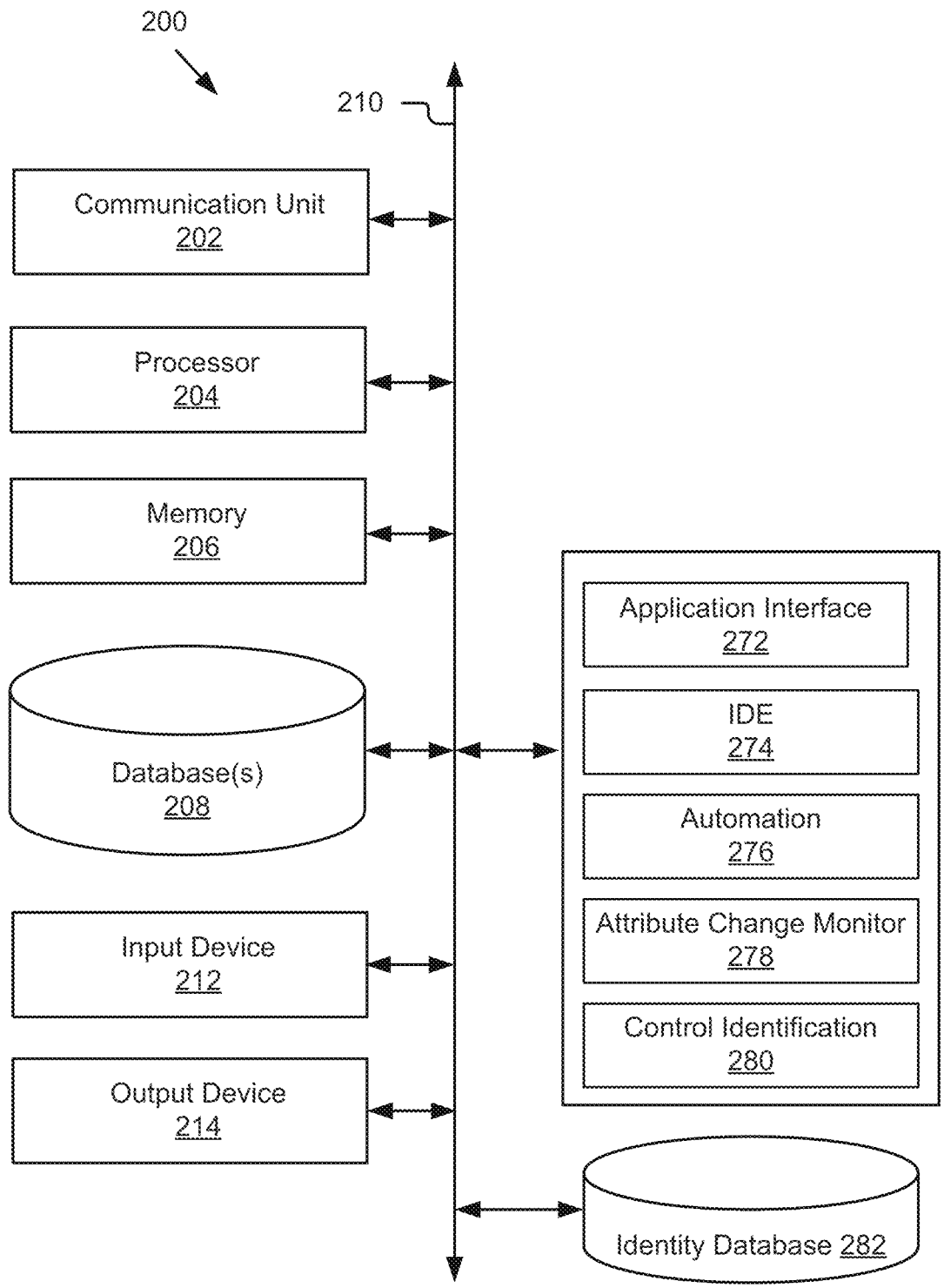
FIG. 2 illustrates an example of a server-based implementation in accordance with an implementation.

The automatic control identification engine 130, automation design studio 110, and adapters may be implemented in different hardware, software, and network configurations. For example, one option is a cloud-based implementation in which the control identification is provided as a service to a browser of a user's computer. Another option is a network service based implementation to provide the control identification via a web server. For example, FIG. 2 shows an example of a server-based implementation 200 having a communication bus 210, an input device 212, an output device 214, a database 208, a memory 206, a processor 204, and a network communication unit 202. An interface to monitor applications 272 may be provided, an IDE module 274, an automation design studio module 276, an attribute change monitor 278, the automatic control identification engine 280, and an identity database 282.

Figure 3:
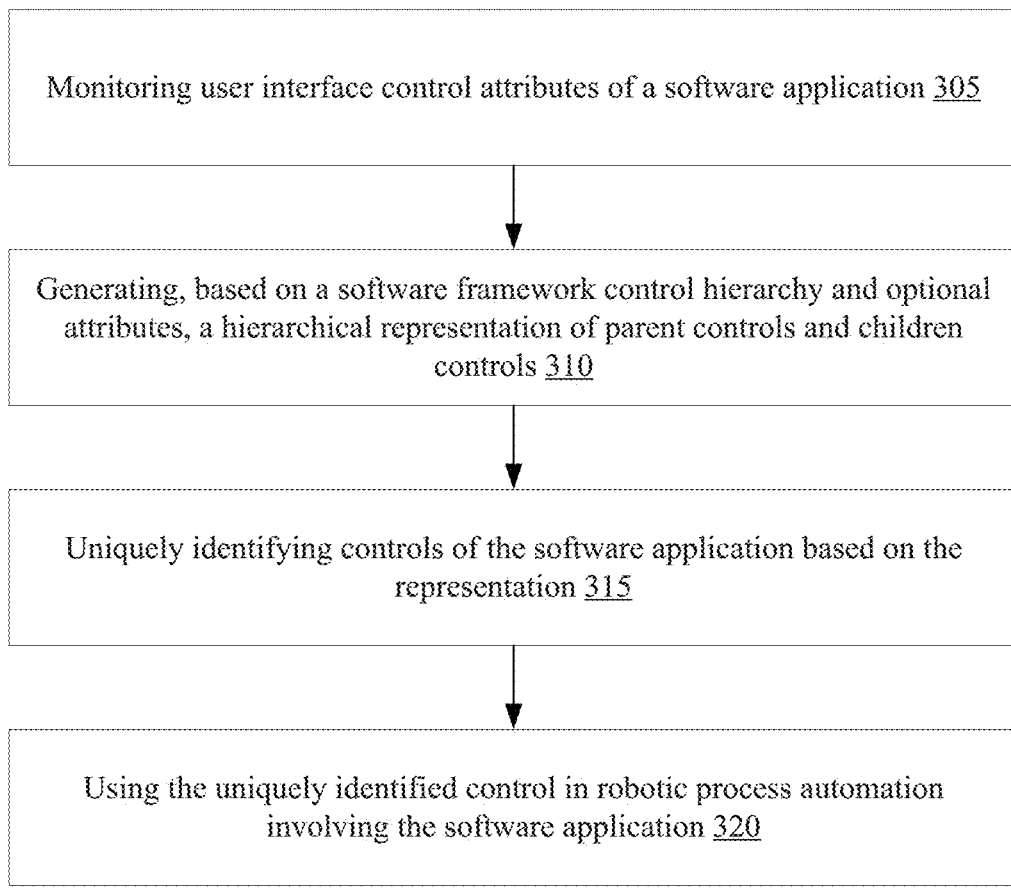
FIG. 3 is a high-level flowchart of a method in accordance with an implementation.

FIG. 3 is a flowchart of a high-level method in accordance with some implementations. In block 305, control attributes of a software application are monitored. For example, the control attributes may be monitored during robotic process automation of software application while a user interacts with the application. In block 310, a representation of parent controls and children controls is generated. The generation of the representation of parent controls and children controls may be based on the framework control hierarchy and optional attributes. In the example of FIG. 3, the generated hierarchical representation does not have to be identical to the one supplied by a framework. For example, an ancestor/descendent order provided by a framework may be respected, but in some situations it may be useful to prune out one or more level of hierarchy using, for example, heuristics and attributes. In some implementations, generating the hierarchical representation of parent controls and children controls includes generating a directed graph. In block 315, controls of the software application are uniquely identified based on the hierarchical representation of parent controls and children controls. For example, if a directed graph is generated, the directed graph may be used to uniquely identify controls. In block 320, the uniquely identified controls are used in a robotics process automation.

Figure 4:
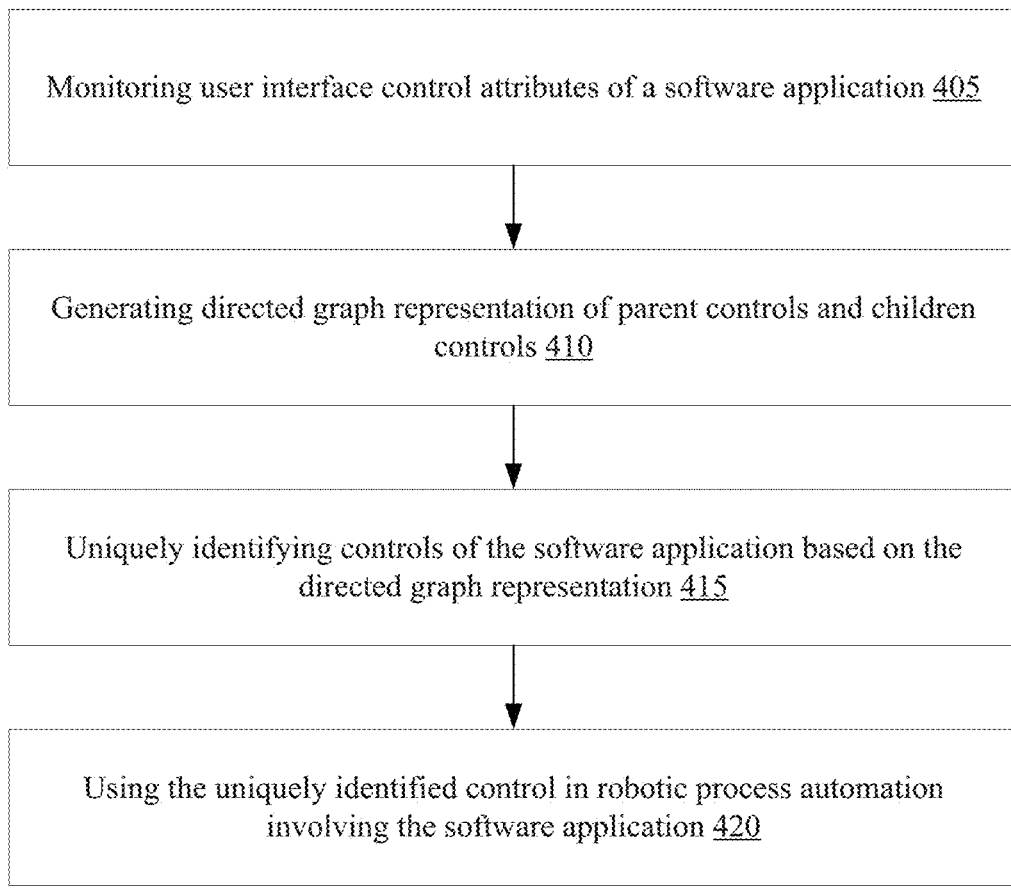
FIG. 4 is a flowchart of a method for using a directed graph for control identification in accordance with an implementation.

FIG. 4 is a flowchart of a method of using a directed graph to aid in uniquely identifying controls. In block 405, control attributes of a software application are monitored. For example, the control attributes may be monitored during robotic process automation of software application while a user interacts with the application. In block 410, a directed graph representation of parent controls and children controls are generated. In block 415, controls of the software application are uniquely identified based on the directed graph representation. In block 420, the uniquely identified controls are used for robotic process automation of the software application.

Figure 5:
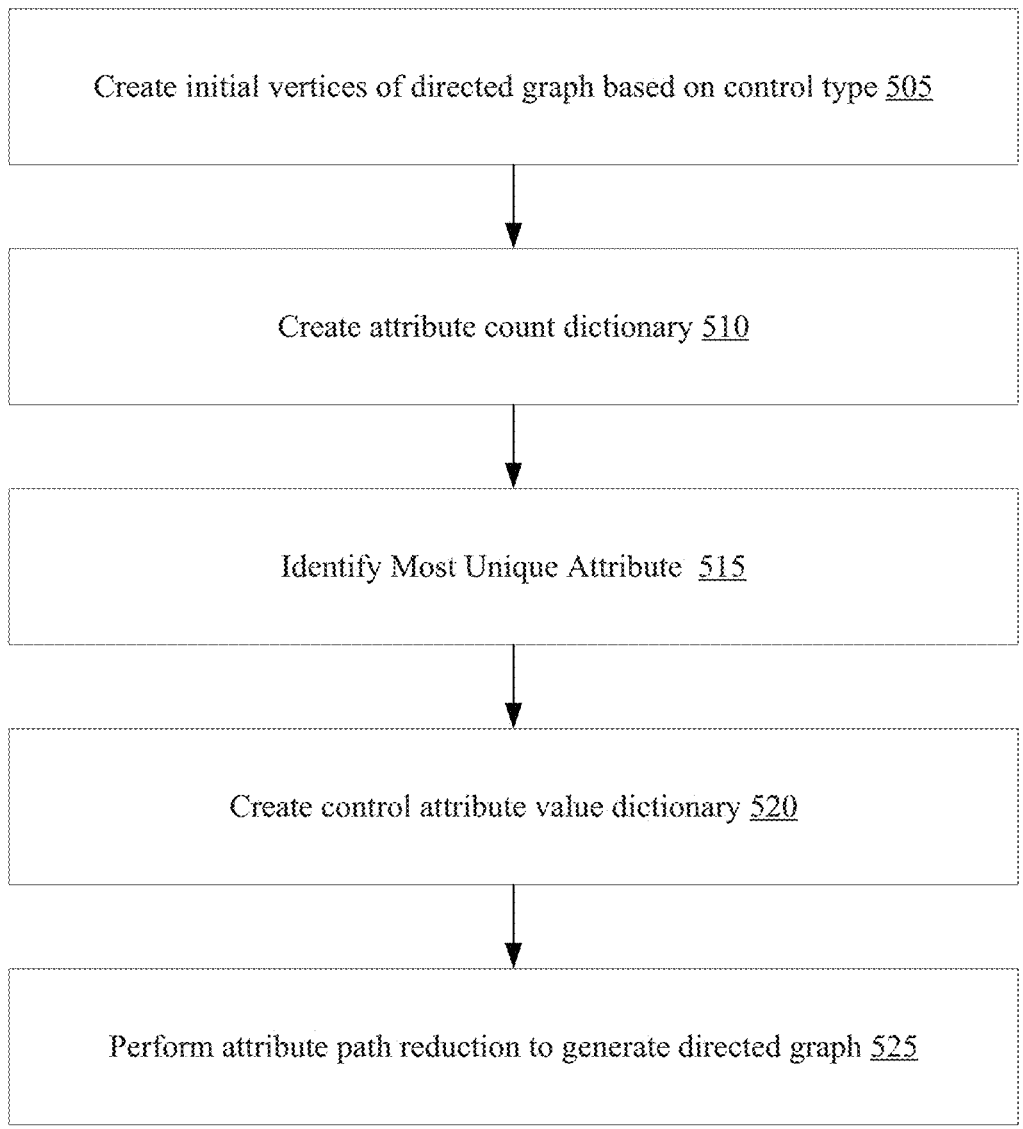
FIG. 5 illustrates a method of generating a directed graph in accordance with an implementation.

FIG. 5 is a flowchart of a method of generating a directed graph for identifying controls of a software application using a directed graph. In some implementations, the automatic control identification engine 130 solves control type branch graphs or sub-graphs based on monitored attributes that are active. In block 505, initial vertices of a directed graph are generated based on control type. In block 510, an attribute count dictionary is created for active attributes. For each active attribute, a count of controls having the attribute value is determined. In block 515, the most unique attribute is identified. This may include accessing the attribute count dictionary, and determining which attribute has the highest number of unique values. In some implementations, if two attributes have the same count, the attribute having the greater weight is chosen. In block 520, a control attribute-value dictionary may be created for each control. This may also include, for each attribute value, creating a list of controls and data associated with the value. In block 525, a directed graph is generated using attribute path reduction. In some implementations, a list of controls is organized into buckets based on the most unique attribute of a given list. In some implementations, if the list of controls is greater than one, the algorithm recurses. If the list of controls is 1, that for each attribute-value pair, the control's identity is found.

The directed graph has vertices that are connected with edges. The connection is directed, coming from a source vertex, and linking to a target vertex. Objects may be identified using the directed graph. Generating the solution to the directed graph results in objects as leaf nodes with their path from the root manifesting a unique identification (ID). This allows the controls to be uniquely identified.

Generating a directed graph model of the control hierarchy representation permits the insertion of new controls to be easily accommodated, and may produce new attribute paths for controls and therefore new IDs.

In some implementations, if a control is destroyed, a shallow copy is retained with all attribute values, assuring that if new controls are created, the graph is solved with the deleted controls and the new controls, and therefore unique IDs are still created.

The control-identification may be performed in real-time. However, in some implementations, a control identification mode may be disabled after controls are initially identified to reduce application performance penalties. However, if the control identification mode is enabled, the control identification data can be updated to reflect application changes.

One aspect is that the automated control identification can handle an arbitrary number of attributes. The automated control identification can handle the addition or removal of controls. In some implementations, the control hierarchy is identified using a directed graph model of controls.

Figure 6:
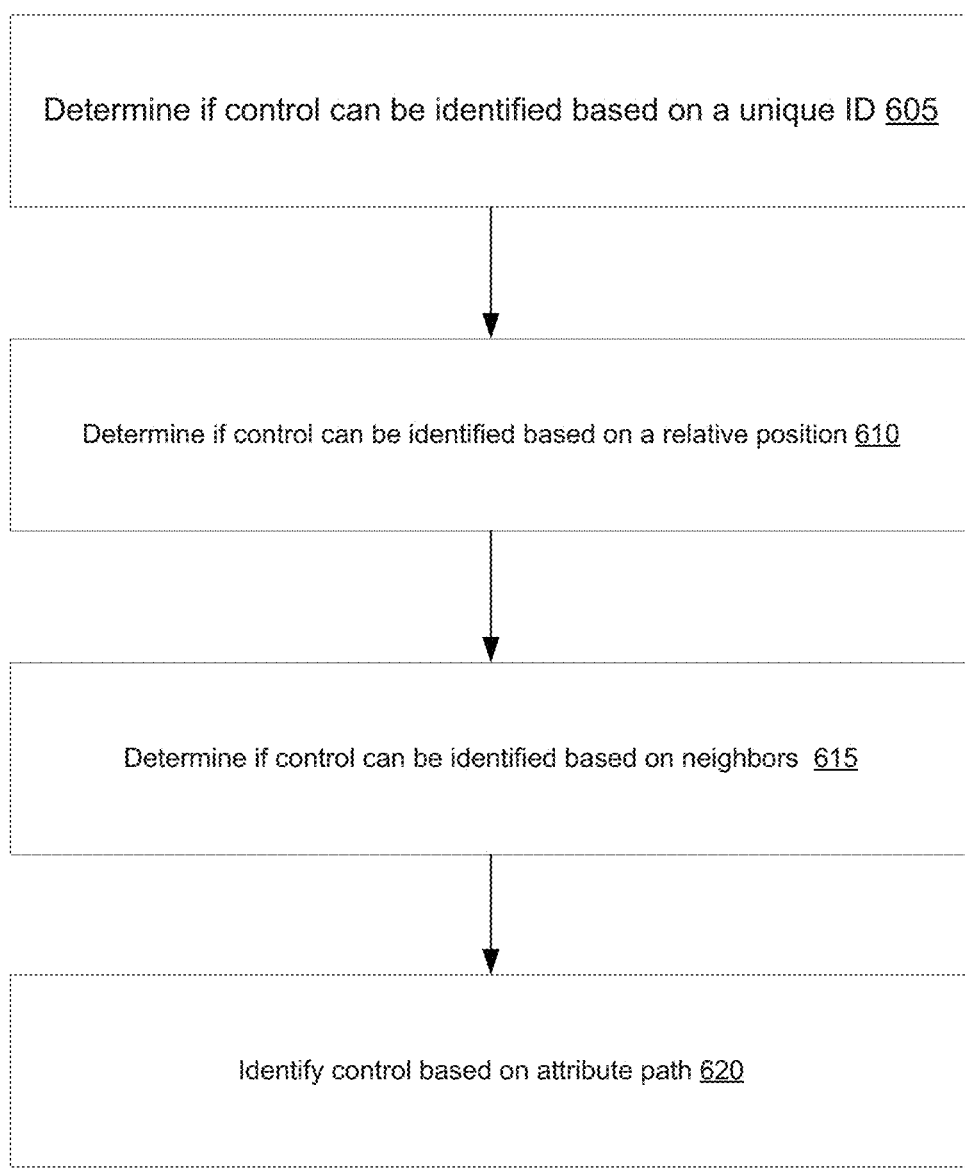
FIG. 6 is a flow chart of a method of using a combination of techniques for control identification in accordance with an implementation.

FIG. 6 is a high level flow diagram of a method in which the control identification of a software application goes through a combination of identification steps that includes detecting a unique ID (e.g., of a framework), using relative position, and using attribute path. In block 605, the control identification proceeds to attempt to identity a control based on if a unique control ID is used. In block 610, the control identification proceeds to attempt to identify a control based on relative position. In block 615, the control identification proceeds to attempt to identify a control based on its neighbors. In block 620, the process then uses attribute path to identify a control.

Figure 7:
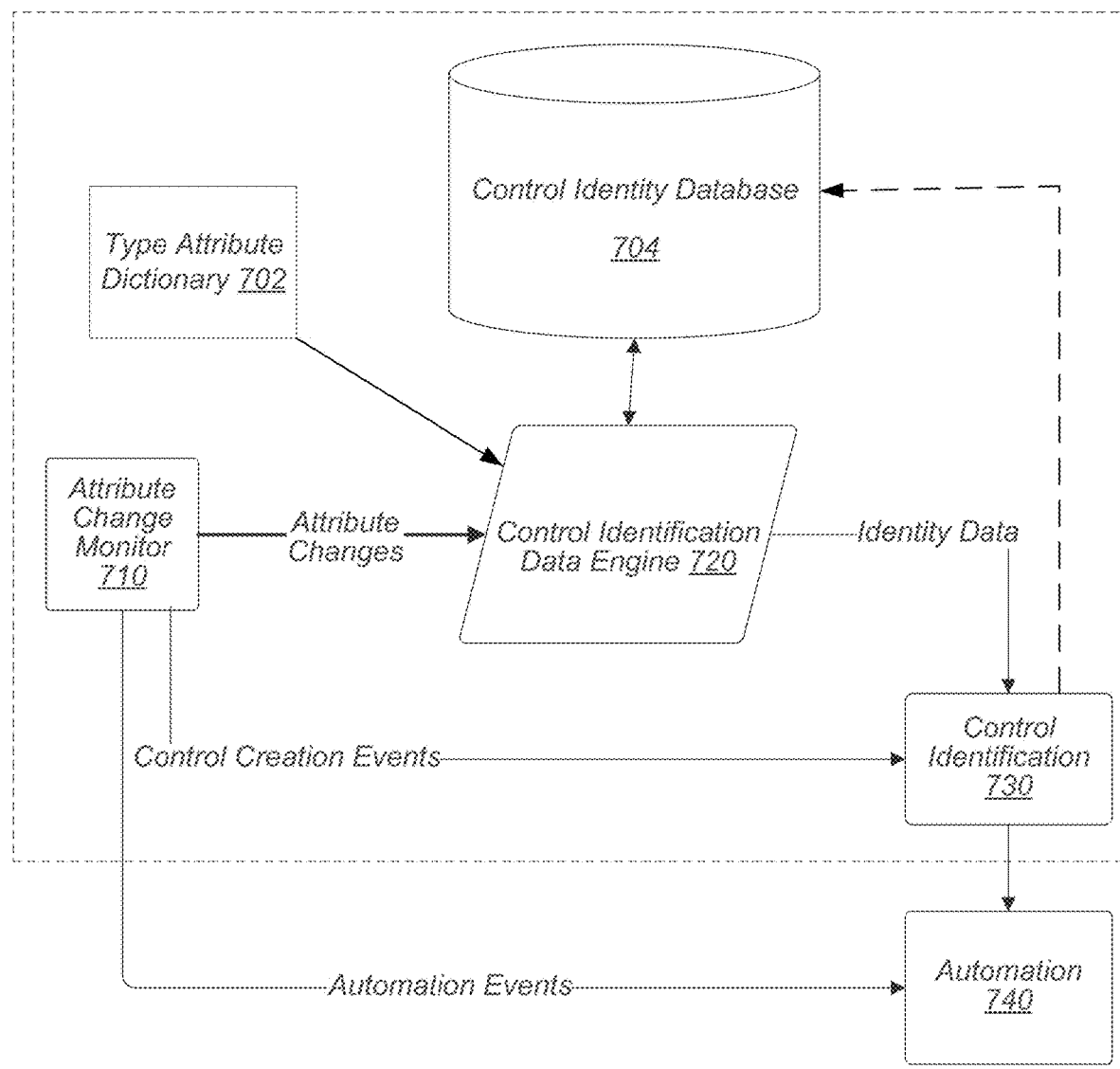
FIG. 7 illustrates control identification for automation in accordance with an implementation.

FIGS. 7, 8, 9 and 10 illustrate in more detail an example of an approach to use a combination of techniques to identify controls. FIG. 7 is a diagram illustrating an example of data flows in a control identification mode to support real-time monitoring of controls in accordance with some implementations. In some implementations, the control identification mode may be disabled during runtime execution for the case of the identity data being static.

As illustrated in FIG. 7, a control attribute change monitor 710 performs real-time monitoring of control attributes to determine attribute changes. The attribute changes are provided to a control identification data unit 720, which may be implemented in-memory. A control type attribute dictionary 702 is generated in advance. For example, the control type attribute dictionary 702 may be generated by examining, via reflection or other techniques, the types implemented in the framework for the attributes the types implement. A control identity database 704 stores controls identified within the application, which may include an attribute graph solution for each control that is a container and monitored attributes and their cached values, along with other optional statistical information.

The available identity data is provided to a control identification element 730. The control identification element 730 also receives information on control creation events from the control attribute change monitor 710. The identified controls are used by automation element 740 for detected automation events. That is, as a user interacts with a software application, attributes are monitored, controls are identified, and the identified controls are used for automation.

Figure 8:
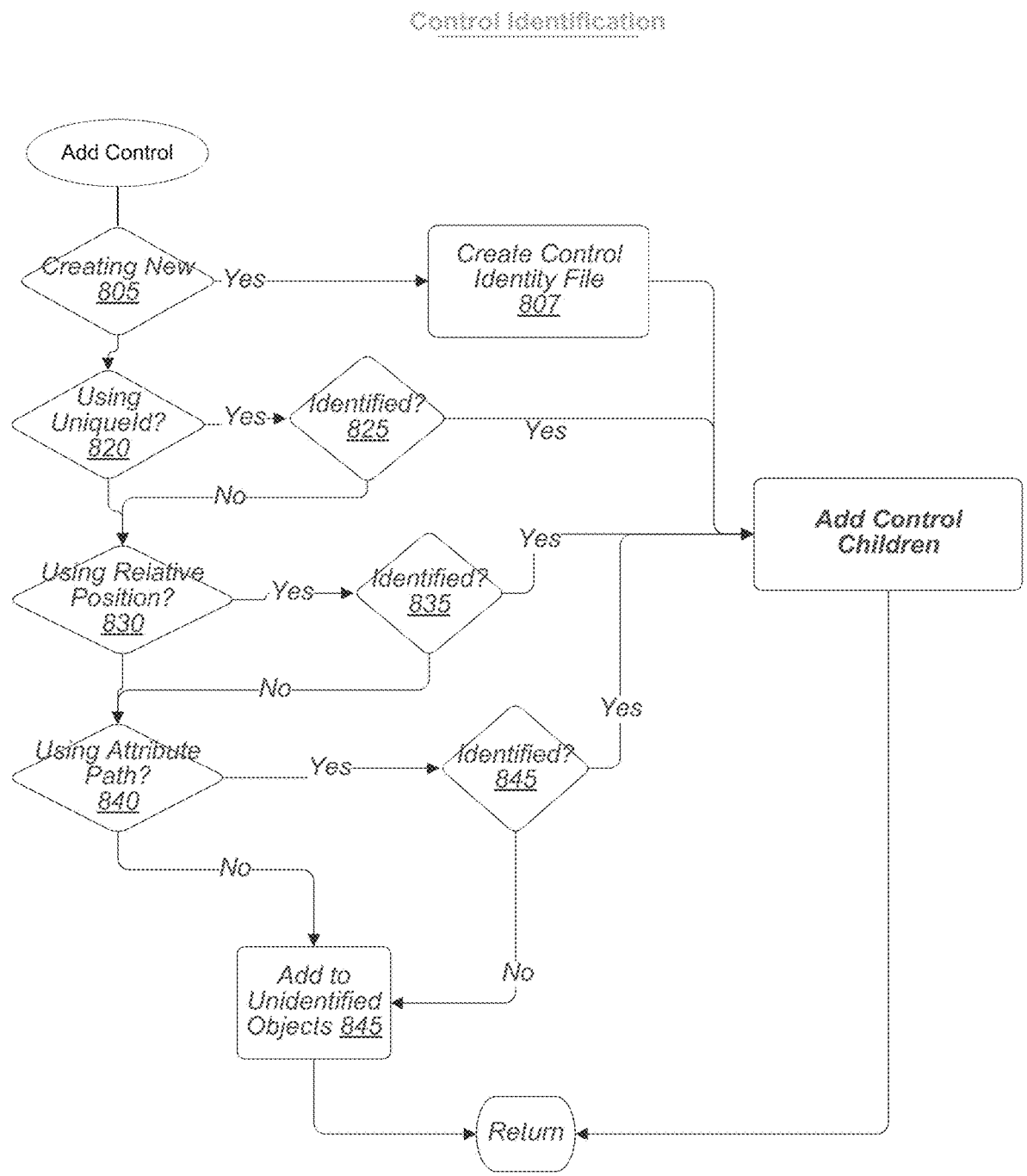
FIG. 8 illustrates a method of adding a control in accordance with an implementation.

FIG. 8 is a flowchart for adding a control in control identification in accordance with some implementation. In block 805, a determination is made whether a new control is being added. If yes, an identity file is created in block 807, where the identity file resides in a control identity database and holds the cache of data for a control, whether a control is created or has gone away. That is, the identity file is an object of the class that models a record of that database. A determination is made in block 820 if a unique ID is being used. If yes, the process attempt to identify 825 the control using the unique ID. If the control cannot be identified using a unique ID, the process moves on in blocks 830 and 835 to attempt to identify the control based on relative position of the control in a user interface. If relative position is not used, then the process moves on to attempt to use attribute path reduction in blocks 840 and 845 to identify the control. In some cases, there may be unidentified object 850. Block 860 adds control children based on inputs that may include the identity file created in block 807 and control identification based on using a unique ID, relative position, or attribute path.

Figure 9:
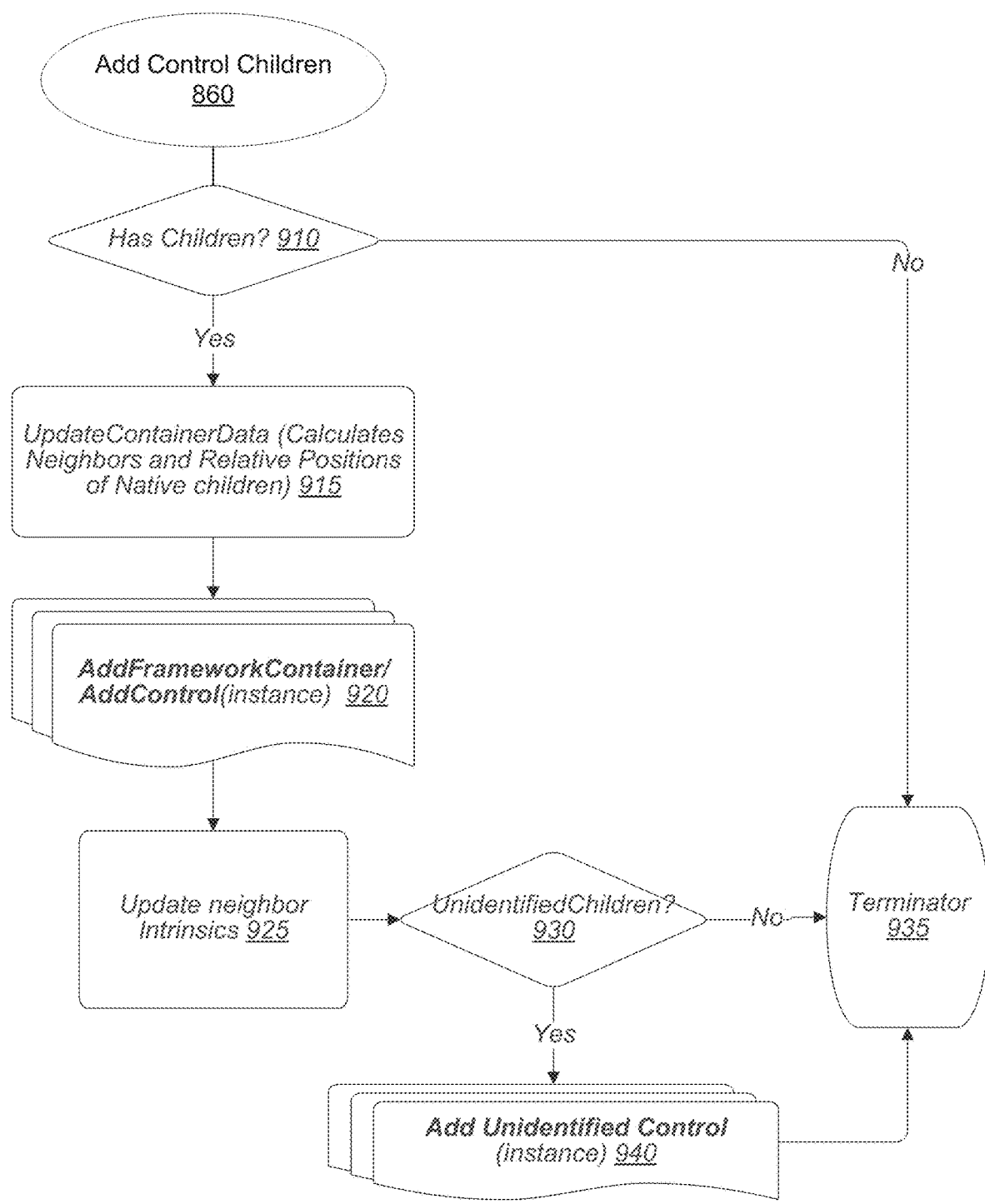
FIG. 9 illustrates a method of adding control children in accordance with an implementation.

FIG. 9 is a flowchart for the adding control children in block 860. A determination is made if the control has children in block 910. If not, the subprocess is terminated in block 935. If Yes, container data is updated in block 915. The update of the container data may include calculating positions of neighbors and relative positions of native children. In block 920, an add framework container is added for a control instance. In block 925, neighbor intrinsic data is updated. In block 930 unidentified children are identified based on the updated neighbor information determined in block 930. If not, the subprocess is terminated in block 935. If yes, the sub-process adds an unidentified control in block 940.

Figure 10:
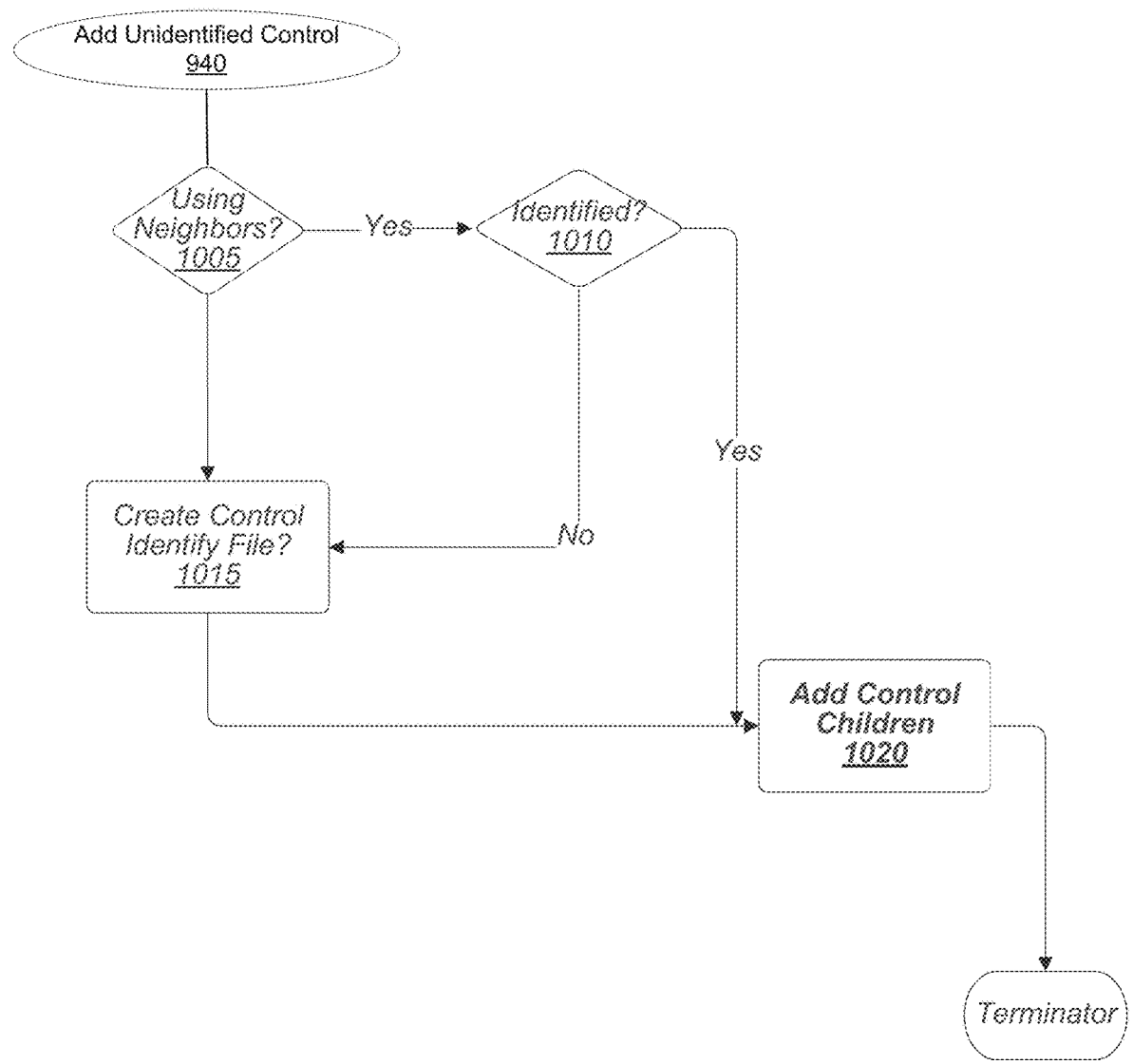
FIG. 10 illustrates a method of adding unidentified controls in accordance with an implementation.

FIG. 10 illustrates in more detail the add unidentified control in block 940. This corresponds to a second pass of control identification. Controls that have remained unidentified after their siblings have been processed may, in some cases, not rely on attributes dependent on the identification of their siblings. In block 1005, a determination is made whether the unidentified control can be determined using neighbors. If yes, determination block 1010 determines whether the unidentified control is determinable based on using neighbors. If yes, control children are added in block 1020. Otherwise, an identity file is created in block 1015 and used to identify control children to be added in block 1020.

Figure 11:
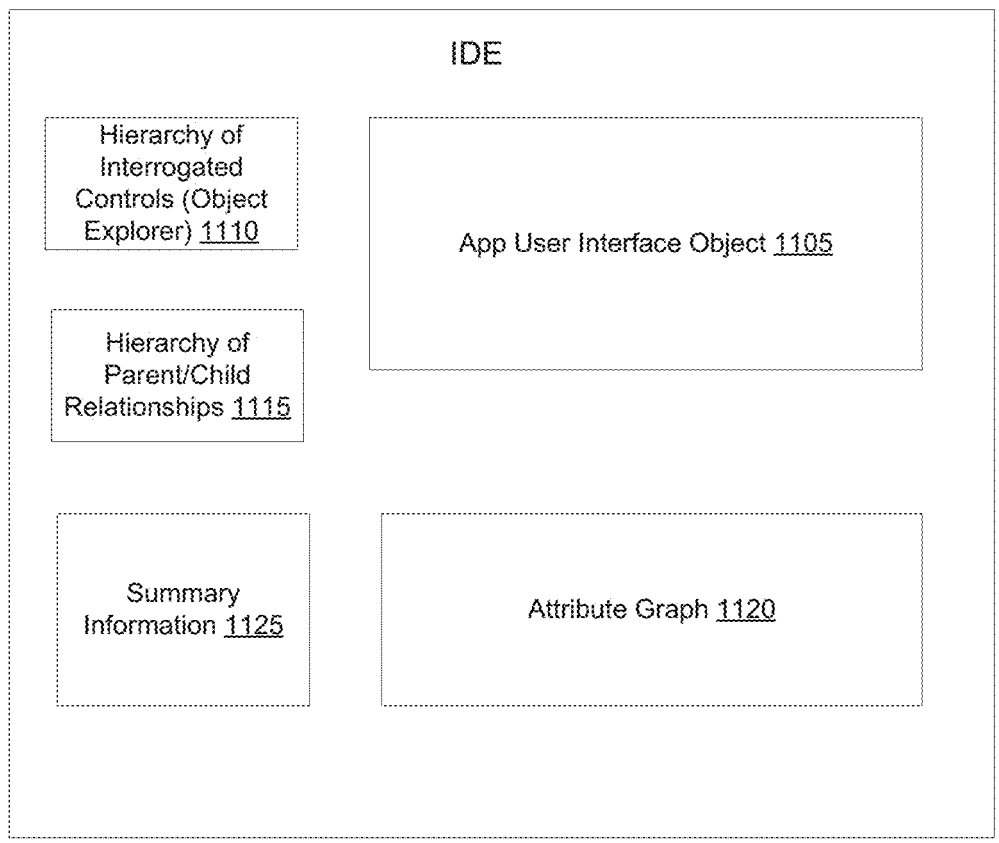
FIG. 11 illustrates elements in an example of an IDE user interface in accordance with an implementation.

As illustrated in FIG. 11, an exemplary user interface for an IDE includes a window 1105 showing a user interface of an application being automated, an "object explorer" window that shows a hierarchy of controls 1110 that have been interrogated (selected) for automation. In some implementations, a window showing a hierarchy of parent/child relationships 1115 with a root label shows all the controls that have been seen in the application. In some implementations, the hierarchy of parent/child relationships shows the set of currently active controls in an application being automated (e.g., via a first color coding or check marks). The hierarchy of parent/child relationships may also optionally show controls that have been identified but not currently active (e.g., via a second color coding or cross marks). An attribute graph 1120 may be displayed. Other summary information 1125 may also be displayed.

Figure 12A:
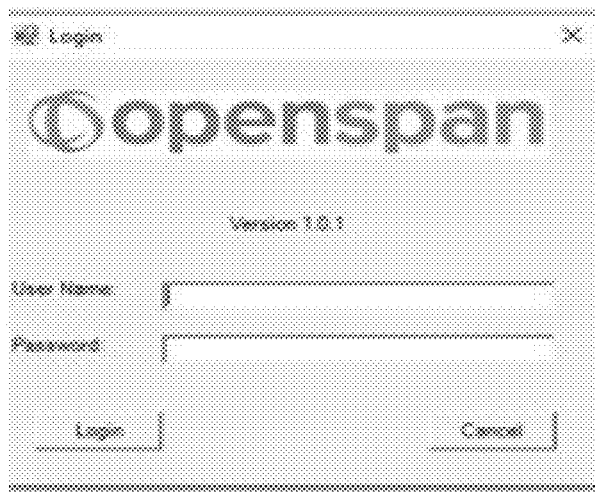
FIGS. 12A, 12B, 12C, and 12D illustrate a sample application and examples of features of an IDE user interface in accordance with an implementation.
Figure 12B:
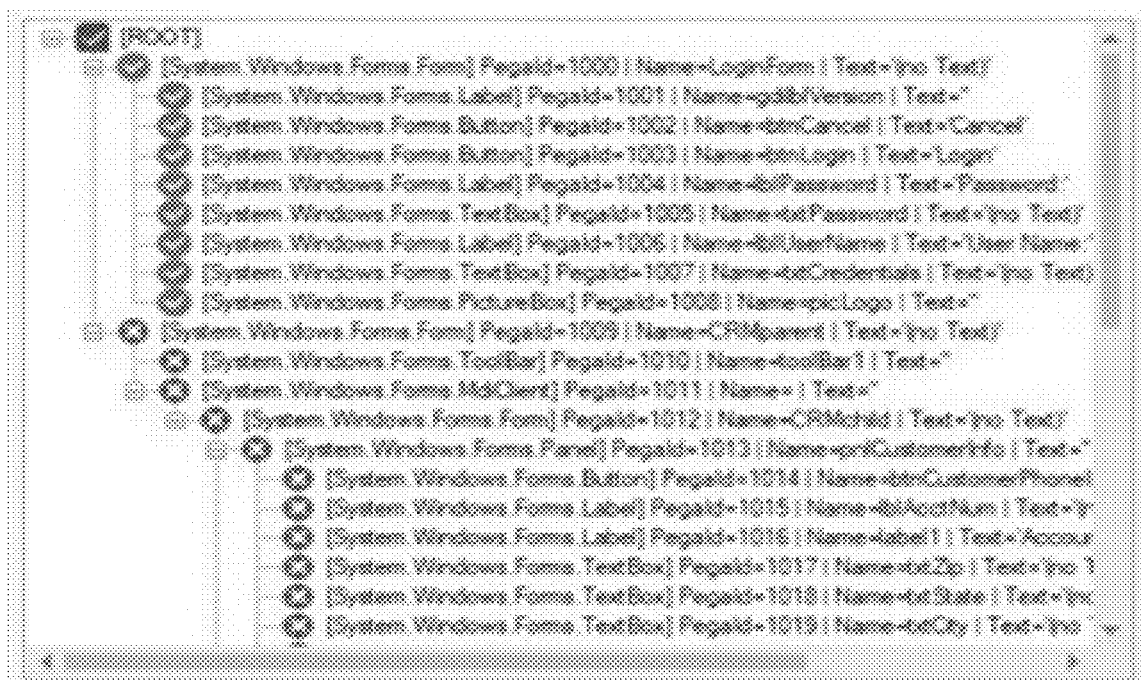
Figure 12C:
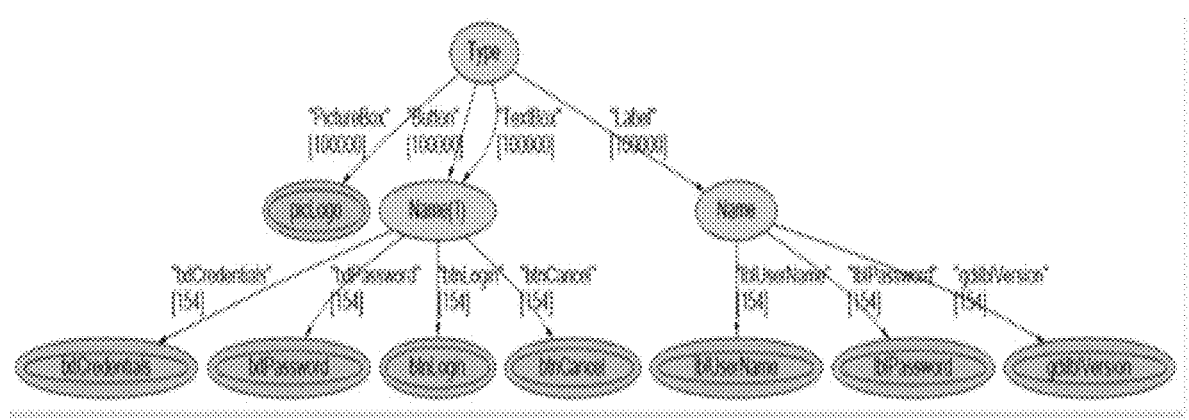
Figure 12D:
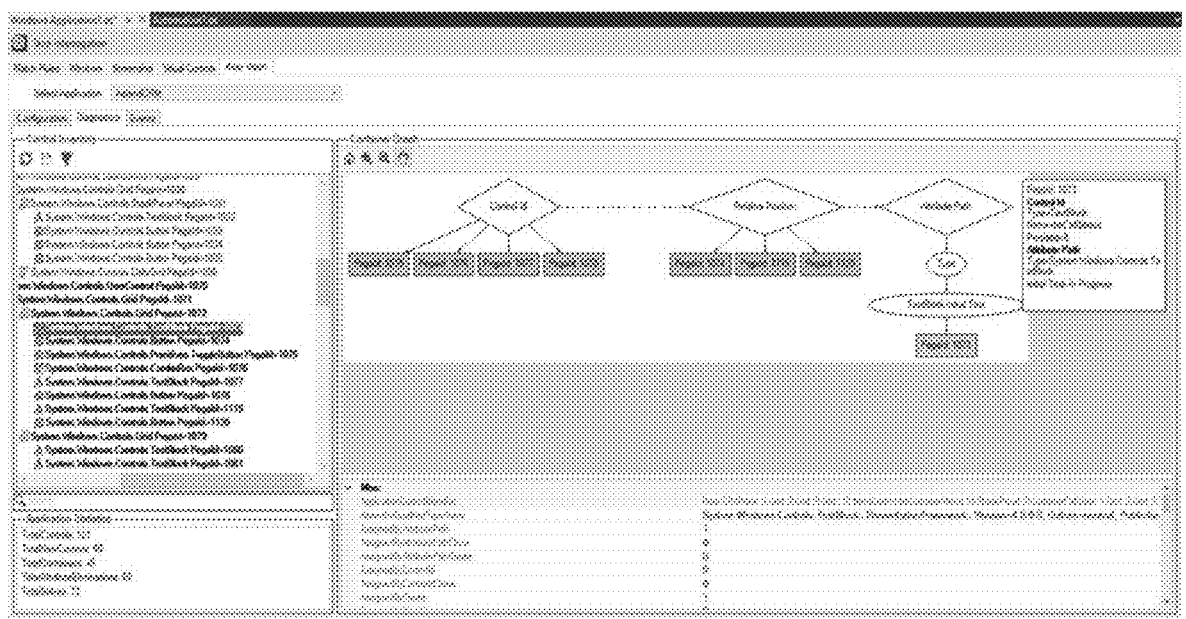

FIG. 12A is an example sample application and FIGS. 12B, 12C, and 12D are examples of screenshots illustrating aspects of user interface features of an IDE in accordance with some implementations. FIG. 12A shows an example of a login form of an application for which controls are to be identified for automation. As an example, the login form of an application may be displayed on a portion of an IDE. FIG.

12B illustrates an "object explorer" window that shows all the application controls that have been observed to be created as the application creates them. The check marks show controls that have been identified by monitoring control attributes. FIG. 12C shows a graphical representation of the attribute graph generated for a group of peer controls in a container. FIG. 12C illustrates how the controls are differentiated, first by type and then by other attributes when multiples of the same type exist. In this example, the attribute graph is generated for the login form. There are thus buttons, labels and textboxes. The arrows are indicative of a direct graph representation that begins from a "type" vertex and which proceeds to identify controls required to automate a login process. Comparing FIGS. 12B and 12C, it can be seen that the object explorer window view of interrogated controls provides only limited information. FIG. 12C shows a graphical hierarchy of controls as a directed graph, which permits identification of the relevant controls and parent-child relationships, which is useful for automation.

FIG. 12D illustrates an example of a container graph showing how the control identification engine solves for controls at a container level. In some implementations, when a user selects a control that is a container in a control inventory, then the container's children will be displayed along with the technique that was used to solve for the control and with information about that control. This permits a user to select a control in the graph to get additional information on how a control was solved for. The "PegaID" in this example is a type of unique ID generated based the different techniques described earlier, which may for example include a unique ID associated with the framework, or be based on an identification signature or identification metric associated with an attribute graph, relative position, neighbors, etc. In the illustrated example, a "PegaID" for the button control with PegaId 1073 has been selected in the control inventory. The graph for this control and its siblings are displayed in the container graph. Controls that have PegaIds 1075, 1076, 1077, and 1078 were solved for by control ID technique. Controls that have PegaIds 1074, 1119, 1120 were solved for by a relative position technique. Control 1073 was solved for by the attribute path technique. Since in this example it was been selected in the graph, additional information is displayed in a popup for the control. For example, a popup may display attribute values used by the various techniques to solve for the control. In this case, PegaId 1073 was unable to be solved for by the control Id technique, and shows you the values it found. It was able to be solved for by attribute path reduction using the initial text attribute. This value is displayed in the popup.

While FIGS. 12A, 12B, 12C, and 12D illustrate a simple example, more complex examples with more controls and more attributes are more typical use scenarios. For example, after login, there may be multiple screens that are navigated as part of an automation process. There may also be more complex screens with multiple text boxes, control buttons, etc. In these more complex automation scenarios, automatically identifying controls becomes extremely beneficial for robotic process automation due to the high burden on users to use manual techniques, such as match rules.

Figure 13:
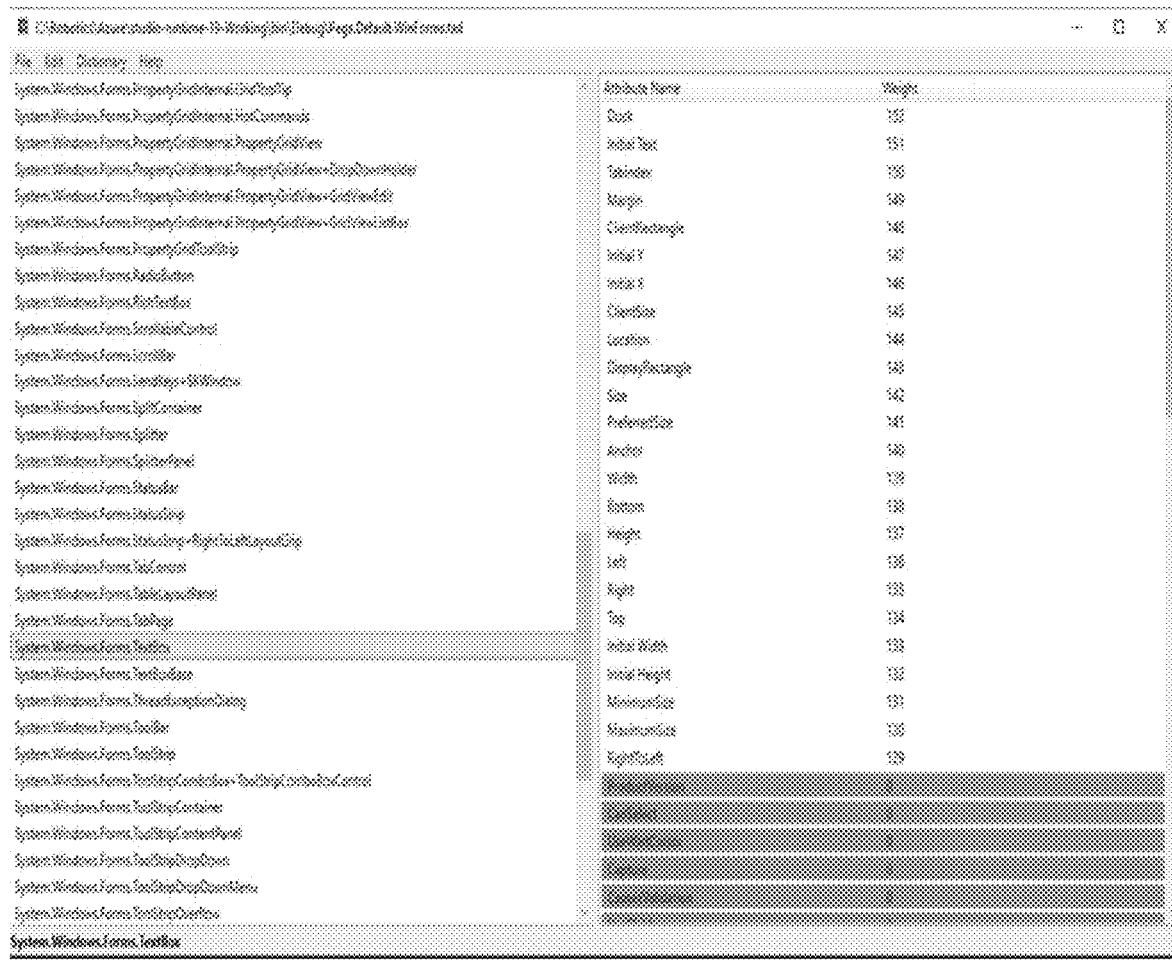
FIG. 13 illustrates a type attribute dictionary in accordance with an implementation.

FIG. 13 illustrates an example of a control type attribute dictionary. The control type attribute dictionary includes a set of control types, attribute names, and weights. As previously discussed, for a particular platform and framework, the dictionary may be customized.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi') transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method, comprising:
   monitoring user interface control type attributes of a dynamic software application as a user interacts with a user interface of the dynamic software application to implement a business process;
   automatically identifying a hierarchy of parent and children user interface controls of the dynamic software application based on monitored user interface control type attributes; including generating a directed graph based on at least one monitored user interface control type attribute and using the directed graph to identify parent and children user interface controls;
   automatically identifying at least one user interface control of the dynamic software application based on at least one of a unique ID, a neighboring control, a relative position with respect to other controls, and the directed graph;
   performing robotics process automation of the business process by automating execution of a sequence of user interface interactions of the dynamic software application utilizing the at least one user interface control and the identified hierarchy of parent and children user interface controls; and
   automatically detecting and adapting to an added user interface control or a deleted user interface control of the dynamic software application.

2. The method of claim 1, comprising using a user interface control type attribute dictionary to determine user interface control attribute types of the monitored user interface control attributes.

3. The method of claim 1, wherein generating the directed graph comprises performing attribute path reduction.

4. The method of claim 1, wherein the directed graph has initial vertices based on control type and generating the directed graph comprises, for at least one attribute value, determining a count of user interface controls that have the attribute value, and determining a most unique attribute.

5. The method of claim 1, further comprising displaying a representation of a user interface control hierarchy of identified user interface controls.

6. The method of claim 1, wherein monitoring user interface control type attributes of the dynamic software application comprises at least one of: 1) monitoring organic user interface control type attributes of the software application and 2) monitoring custom user interface control attributes generated by a driver.

7. A computer system, comprising:
   a processor and a memory storing computer instructions to execute on the processor a process to:
   monitor user interface control type attributes of a dynamic software application as a user interacts with a user interface of the dynamic software application to implement a business process;
   automatically identify a hierarchy of parent and children user interface controls of the dynamic software application based on monitored user interface control type attributes; including generating a directed graph based on at least one monitored user interface control type attribute and using the directed graph to identify parent and children user interface controls;

automatically identify at least one user interface control of the dynamic software application based on at least one of a unique id, a neighboring control, a relative position with respect to other controls, and the directed graph;

perform robotics process automation of the business process by automating execution of a sequence of user interface interactions of the dynamic software application utilizing the at least one user interface control of the dynamic software application and the identified hierarchy of parent and children user interface controls; and automatically detect and adapt to an added user interface control or a deleted user interface control of the dynamic software application.

8. A non-transitory computer readable medium having computer program instruction which when executed on a processor execute a method, comprising:

monitoring user interface control type attributes of a dynamic software application as a user interacts with a user interface of the dynamic software application to implement a business process;

automatically identifying a hierarchy of parent and children user interface controls of the dynamic software application based on monitored user interface control type attributes; including generating a directed graph based on at least one monitored user interface control type attribute and using the directed graph to identify parent and children user interface controls;

automatically identifying at least one user interface control of the dynamic software application based on at least one of a unique id, a neighboring control, a relative position with respect to other controls, and the directed graph;

performing robotics process automation of the business process by automating execution of a sequence of user interface interactions of the dynamic software application utilizing the at least one user interface control of the dynamic software application and the identified hierarchy of parent and children user interface controls; and automatically detecting and adapting to an added user interface control or a deleted user interface control of the dynamic software application.

\* \* \* \* \*